(12) United States Patent
Sitter, Jr.

(10) Patent No.: US 10,001,636 B2
(45) Date of Patent: Jun. 19, 2018

(54) OPTICAL CONFIGURATIONS FOR OPTICAL FIELD MAPPINGS FOR BACK-SCANNED AND LINE-SCANNED IMAGERS

(71) Applicant: RAYTHEON COMPANY, Waltham, MA (US)

(72) Inventor: David N. Sitter, Jr., Torrance, CA (US)

(73) Assignee: RAYTHEON COMPANY, Waltham, MA (US)

( * ) Notice: Subject to any disclaimer, the term of this patent is extended or adjusted under 35 U.S.C. 154(b) by 169 days.

(21) Appl. No.: 15/098,769

(22) Filed: Apr. 14, 2016

(65) Prior Publication Data

US 2017/0299856 A1     Oct. 19, 2017

(51) Int. Cl.
*G02B 23/06* (2006.01)
*H04N 5/232* (2006.01)
*H04N 5/353* (2011.01)
*G02B 13/08* (2006.01)

(52) U.S. Cl.
CPC .......... *G02B 23/06* (2013.01); *G02B 13/08* (2013.01); *H04N 5/2328* (2013.01); *H04N 5/353* (2013.01)

(58) Field of Classification Search
CPC ...... G02B 23/06; G02B 13/08; H04N 5/2328; H04N 5/353
See application file for complete search history.

(56) References Cited

U.S. PATENT DOCUMENTS

| | | |
|---|---|---|
| 4,733,955 A | 3/1988 | Cook |
| 4,804,258 A | 2/1989 | Kebo |
| 5,071,240 A | 12/1991 | Ichihara et al. |
| 5,078,502 A | 1/1992 | Cook |
| 5,363,235 A | 11/1994 | Kiunke et al. |
| 5,526,181 A | 6/1996 | Kunick et al. |
| 5,663,825 A | 9/1997 | Amon et al. |

(Continued)

FOREIGN PATENT DOCUMENTS

| | | |
|---|---|---|
| EP | 0766113 A2 | 4/1997 |
| EP | 2242250 A1 | 10/2010 |

(Continued)

OTHER PUBLICATIONS

Thibault, Simon, Optical design of an hemispherical, long-wave infrared panomorph lens for total situational awareness, May 7, 2009, Proc. SPIE, vol. 7298, pp. 72980Y-1 to 72980Y-9.*

(Continued)

*Primary Examiner* — Christine S Kim
(74) *Attorney, Agent, or Firm* — Lando & Anastasi, LLP

(57) ABSTRACT

Optimal field mappings that provide the highest contrast images for back-scanned and time delay integration (TDI) imaging are given. The mapping can be implemented for back-scanned imaging with afocal optics including an anamorphic field correcting assembly configured to implement a non-rotationally symmetric field mapping between object space and image space to adjust distortion characteristics of the afocal optics to control image wander on a focal plane array. The anamorphic field correcting assembly can include one or more mirrors or lenses having non-rotationally symmetric aspherical departures. For optimal TDI imaging, anamorphic optics are also employed.

11 Claims, 20 Drawing Sheets

(56) References Cited

U.S. PATENT DOCUMENTS

| | | | |
|---|---|---|---|
| 6,016,220 | A | 1/2000 | Cook |
| 6,178,047 | B1 | 1/2001 | Cook |
| 6,342,967 | B1 | 1/2002 | Wilczynski |
| 6,426,834 | B1 | 7/2002 | Braunecker et al. |
| 7,119,969 | B1 | 10/2006 | Amon et al. |
| 8,102,583 | B2 | 1/2012 | Cook |
| 2012/0176671 | A1 | 7/2012 | Cook |
| 2012/0200700 | A1 | 8/2012 | Bennett et al. |
| 2012/0300276 | A1 | 11/2012 | Ohnishi |
| 2014/0240820 | A1 | 8/2014 | Sitter, Jr. |

FOREIGN PATENT DOCUMENTS

| | | |
|---|---|---|
| EP | 2525235 A1 | 11/2012 |
| WO | 9921043 A1 | 4/1999 |
| WO | 2012/020413 A1 | 2/2012 |

OTHER PUBLICATIONS

Invitation to Pay Additional Fees and Partial International Search Report for application No. PCT/US2017/016630 dated May 17, 2017.
International Search Report and Written Opinion for application No. PCT/US2017/016630 dated Aug. 23, 2017.
U.S. Appl. No. 13/779,279, US-2014-0240820-A1, filed Feb. 23, 2013, David N. Sitter, Jr.

* cited by examiner

OPTICAL CONFIGURATIONS FOR OPTICAL FIELD MAPPINGS FOR BACK-SCANNED AND LINE-SCANNED IMAGERS

BACKGROUND

In certain imaging applications, such as infrared search and track (IRST), for example, it is desirable for the imaging sensor to scan large fields of regard at a high rate and with diffraction limited performance. Approaches to achieving these goals include using back-scanned sensors, or line-scan imagers with large fields of view. In order to increase the integration time for a scanned two-dimensional (2-D) imaging sensor, the technique of back-scanning is often used to provide step/stare coverage. FIGS. 1A-1B illustrate this concept.

FIG. 1A shows the nominal case for a sensor system in which an afocal telescope 110 is configured to receive incoming electromagnetic radiation 120 and direct the radiation via imaging optics 130 to an imaging sensor 140, which is frequently a focal plane array (FPA). Back-scanning with a mirror 150 behind the afocal telescope 110 provides an agile method to increase the integration time for the FPA 140 by at least partially compensating for movement of the sensor system. Specifically, referring to FIG. 1B, as the system scans in object space, the back-scan mirror 150 tilts to attempt to keep the image fixed on the FPA 140 during the integration time. Thus, the larger sensor system, or a portion thereof, may be scanned at the nominal rate while the smaller back-scan mirror 150 provides the fast motions to implement the step/stare function. This is further illustrated in FIGS. 2A-2B.

Referring to FIG. 2A, there is illustrated a schematic representation of the back-scanned sensor's field of view (i.e., field of view of the sensor 140) within the field of view 210 of the afocal telescope 110. The sensor's field of view is scanned through the afocal telescope's field of view 210, as represented by arrow 220. Box 230a represents the sensor's field of view at a first or earlier point in time, with a corresponding target point position 235a, and box 230b represents the sensor's field of view at a second or later point in time, with a corresponding target point position 235b. The target point 235 effectively sweeps through the telescope's field of view 210 during the back-scan operation. FIG. 2B shows the corresponding back-scanned sensor field of view 230 in object space. In FIG. 2B, the afocal telescope's field of view 210 is scanning to the right, as represented by arrow 240, while the back-scan mirror 150 moves to keep the FPA's field of view 230 fixed during the integration time (also referred to as exposure time). Back scanning holds the sensor field of view 230 fixed in object space as the afocal telescope field of view 210 scans.

SUMMARY OF INVENTION

Although back-scanning can hold one field point, e.g., target point 235, relatively stable on the focal plane array (FPA), all other field points may wander during the exposure due to imaging distortion characteristics of the afocal telescope. Aspects and embodiments are directed to optimal field mappings, which can be implemented in optical configurations with controlled distortion characteristics, for back-scanned and line-scanned imagers that reduce field point wander and the associated image blurring. A variety of system architectures to achieve high fidelity field mappings are described below, along with methods and systems to optically implement examples of the optical field mappings.

According to one embodiment an optical imaging system configured for back-scanned imagery comprises an imaging sensor, an imager configured to focus electromagnetic radiation onto the imaging sensor, the imaging sensor being configured to form an image from the electromagnetic radiation, afocal optics configured to receive the electromagnetic radiation and to direct the electromagnetic radiation via an exit pupil of the afocal optics to the imager, the afocal optics including at least one anamorphic field correcting optical element configured to implement a non-rotationally symmetric field mapping between object space and image space to set distortion characteristics of the afocal optics to control image wander on the imaging sensor for off-axis image points during a back-scan operation, and a back-scan mirror positioned proximate the exit pupil of the afocal optics and between the afocal optics and the imager, and configured to perform the back-scan operation to stabilize the image on the imaging sensor.

In one example the afocal optics includes a plurality of optical elements arranged along a primary optical axis extending between an entrance pupil of the afocal optics and the exit pupil. In another example the afocal optics includes an on-axis afocal telescope and a pupil relay, the afocal telescope being configured to receive the electromagnetic radiation via the entrance pupil and direct the electromagnetic radiation to the pupil relay, the pupil relay being configured to re-image the electromagnetic radiation onto the back-scan mirror via the exit pupil. In one example the pupil relay includes the at least one anamorphic field correcting optical element. In another example the at least one anamorphic field correcting optical element includes first and second lenses, the afocal optics being configured to form an intermediate image between the first and second lenses. Each of the first and second lenses may include front and back surfaces having non-rotationally symmetric aspherical departures. In one example the afocal telescope includes a head mirror configured to scan a field-of-view of the afocal telescope over a field of regard, and the system further comprises a derotation element positioned between the afocal telescope and the pupil relay. The plurality of optical elements may include a plurality of lenses.

In one example the imaging sensor is a focal plane array having a two-dimensional array of imaging pixels.

In one example, at least one anamorphic field correcting optical element includes first and second field correcting lenses each with front and back surfaces having non-rotationally symmetric aspherical departures, the afocal optics being configured to form an intermediate image between the first and second field correcting lenses.

In one example the non-rotationally symmetric field mapping is defined by $\theta_i = A_{mag} \theta_o$ and $\phi_i = A_{mag} \phi_o$, wherein $\theta_i$ and $\phi_i$ are ray angles in image space, $\theta_o$ and $\phi_o$ are ray angles in object space, and $A_{mag}$ is a magnification of the afocal optics.

According to another embodiment an optical imaging system comprises an imaging sensor configured to perform time delay integration imaging, and an optical sub-system configured to receive electromagnetic radiation from a viewed scene and to focus the electromagnet radiation onto the imaging sensor, the imaging sensor being configured to form an image from the electromagnetic radiation, the optical sub-system including at least one anamorphic field correcting optical element configured to implement a non-rotationally symmetric field mapping to set distortion characteristics of the optical sub-system to control image wander on the imaging sensor for off-axis image points during an integration period of the imaging sensor.

In one example the non-rotationally symmetric field mapping is defined by relationships $x=f\theta_x$ and $y=f\phi$, the relationships describing a mapping of angles $\theta_x$ and $\phi$ in object space to points x and y on the imaging sensor.

Another embodiment is direction to an imaging method comprising acts of directing electromagnetic radiation with an optical sub-system to an imaging sensor, and adjusting distortion characteristics of the optical sub-system with a field correcting assembly to control image wander for off-axis image points, the field correcting assembly including at least one anamorphic field correction optical element configured to implement a non-rotationally symmetric field mapping to set the distortion characteristics of the optical sub-system.

The imaging method may further comprise performing time delay integration imaging with the imaging sensor, wherein adjusting the distortion characteristics of the optical sub-system includes controlling the image wander for the off-axis image points during an integration period of the imaging sensor.

In one example the optical sub-system includes afocal optics and an imager, and directing the electromagnetic radiation includes receiving the electromagnetic radiation from a viewed scene with the afocal optics, directing the electromagnetic radiation from the afocal optics to the imager to form an image, the image being centered about an optical axis of the afocal optics that passes through an exit pupil of the afocal optics to the imager, and focusing the electromagnetic radiation onto the imaging sensor with the imager. The imaging method may further comprise back-scanning the electromagnetic radiation with a back-scan mirror optically coupled to the afocal optics and positioned proximate the exit pupil of the afocal optics to stabilize the image on the focal plane array. In one example adjusting the distortion characteristics of the optical sub-system includes adjusting the distortion characteristics of the afocal optics with the field correcting assembly to control image wander for the off-axis image points during the back-scanning operation, wherein the at least one anamorphic field correction optical element is configured to implement the non-rotationally symmetric field mapping between image space and object space to adjust the distortion characteristics of the afocal optics.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

As discussed above, back-scanned imagers or line-scanned imagers with large fields of view can be used to achieve scanning of the sensor field of view over a large field of regard at a high rate and with diffraction limited performance. However, standard optical design forms introduce image blurring for off-axis field points during the exposure/integration time, which lowers the signal to noise ratio of the target signal.

Figure 3:
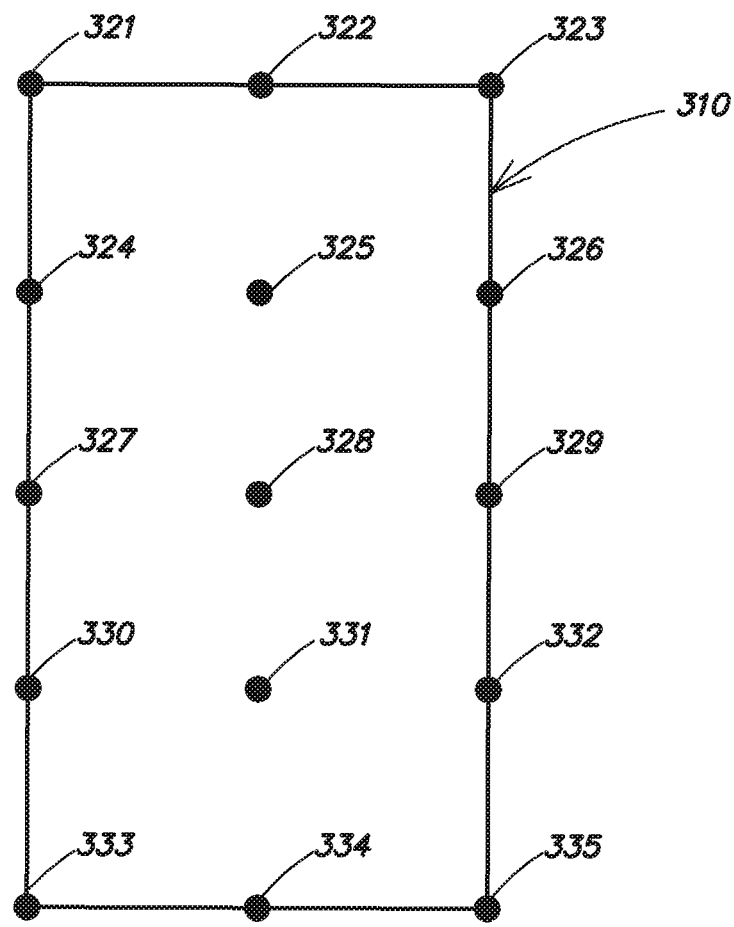
FIG. 3 is a diagram illustrating an example of a sensor's field of view in object space, showing a plurality of field points.

To further demonstrate the issue of image wander, the following examples consider the case of an infrared search and track (IRST) sensor. FIG. 3 schematically illustrates an example of a nominal sensor frame field-of-view (FOV) 310 of an exemplary IRST sensor in object space, showing the locations of a plurality of field points 321-335. The field points include top left 321, top 322, top right 323, left top middle 324, top middle 325, right top middle 326, left 327, on-axis (center) 328, right 329, left bottom middle 330, bottom middle 331, right bottom middle 332, bottom left 333, bottom 334, and bottom right 335. Although the back-scan mirror can hold one field point, typically the central or on-axis field point 328, relatively stable on the focal plane array (FPA), all other field points may wander during the exposure due to imaging distortion characteristics of the afocal telescope.

The optimal field mapping for one-dimensional (1-D) scanning (e.g., horizontal scanning of a laser spot beam) is well known. For afocal systems, the 1-D optical field mapping is defined based on the angular relationship between rays entering the telescope ($\theta_i$) and leaving the telescope ($\theta_o$), and is given by:

$$\theta_i = A_{mag} \theta_o \quad (1)$$

In Equation (1), $A_{mag}$ is the angular magnification of the afocal telescope. A similar relationship applies for focal systems, replacing $A_{mag}$ with F, the focal length of the system. The optimal 1-D field mapping is not ideal for two-dimensional (2-D) imaging systems. The field mapping of Equation (1) minimizes image wander for field points along a single axis. Accordingly, line-scan systems can use this mapping and achieve adequate results. However, back-scanned systems that include two-dimensional imaging sensors (such as an FPA) with conventional optical design forms suffer significant blurring and reduced signal to noise ratio. The amount and significance of the blurring depends on the magnification of the afocal telescope, the angular field of view, and the number of pixels (on the FPA) across the field of view.

Although the field mapping of Equation (1) can be used, afocal telescopes in 2-D imaging systems are generally optimized to have zero distortion based on the angular relationship between rays entering the telescope ($\theta_i$) and leaving the telescope ($\theta_o$) satisfying the following equation:

$$\tan(\theta_i) = A_{mag} \tan(\theta_o) \quad (2)$$

The relationship of Equation (2) ensures distortion-free images (e.g., lines are imaged to lines). However, similar to configurations designed according to Equation (1), when a back-scan mirror is placed behind the afocal telescope, this relationship introduces image wander or blur for off-axis field points during the exposure. The amount and significance of the blurring again depends on the magnification of the afocal telescope, the angular field of view, and the number of pixels (on the FPA) across the field of view.

Imaging distortion aberrations may also introduce additional image blurring. It is to be appreciated that for a system that does not implement back-scanning, the imaging distortion of an afocal telescope is typically a separate issue from image quality. For example, the image may be sharp, but appear to be distorted. For instance, on-axis and rotationally symmetric lens systems typically display symmetrical pincushion or barrel distortion. Afocal telescopes that are designed with off-axis pupils or with an angularly offset field of view may have more complicated distortion functions.

Figure 4A:
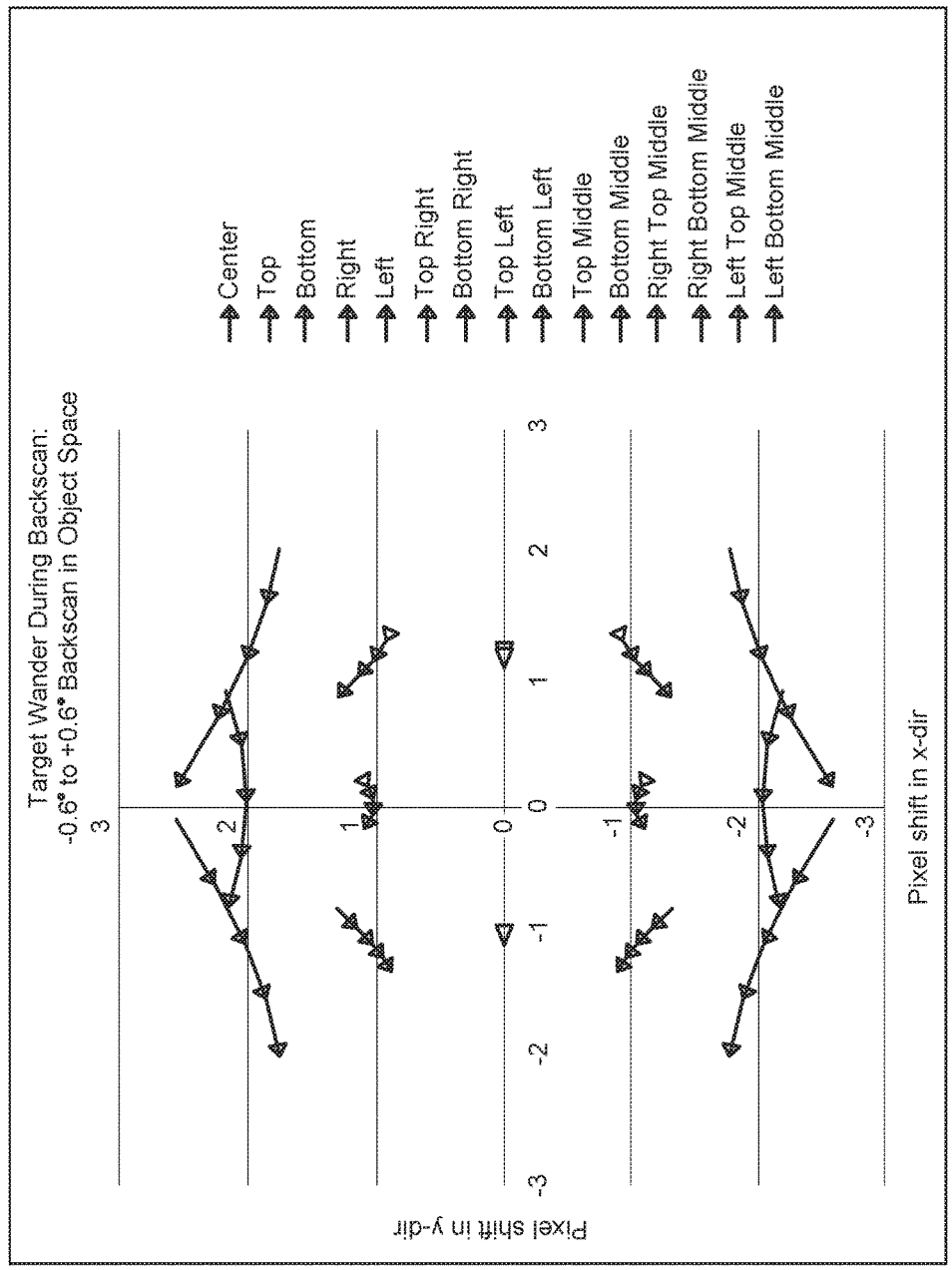
FIG. 4A is a graph illustrating simulated image point wander for the field points of FIG. 3 for an example of an afocal telescope optimized according to the conventional field mapping of Equation (1)
Figure 4B:
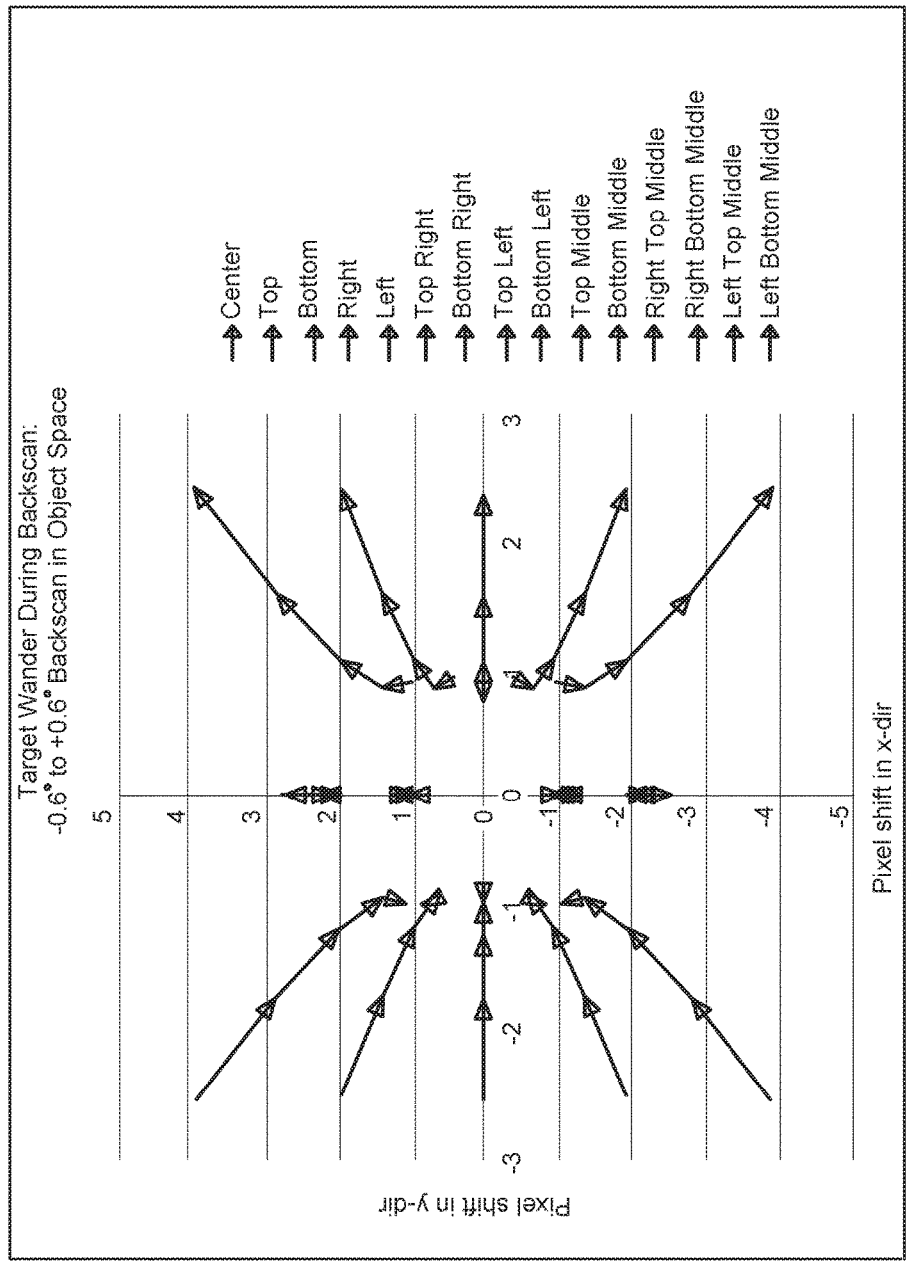
FIG. 4B is a graph illustrating simulated image point wander for the field points of FIG. 3 for an example of an afocal telescope optimized according to the conventional field mapping of Equation (2)

FIGS. 4A and 4B illustrate simulated image point wander during back-scan for examples of afocal telescopes designed according to the field mappings of Equations (1) and (2) respectively. In each case, the frame FOV is 2.887°×1.624°, the sensor is a two-dimensional FPA having 1280×720 pixels, the magnificent of the afocal telescope ($A_{mag}$) is 4×, and the pixel instantaneous field-of-view (IFOV) is 39.4 μrad (microradians). In both examples, the back-scan is over ±0.6° in object space. Other system parameters used in these simulations are as follows. In each example, the entrance pupil diameter is 5 inches, the imager focal length is 5 inches (for a system effective focal length of 20 inches), and the spectral band is 8-9.5 μm (long-wave infrared).

Figure 5:
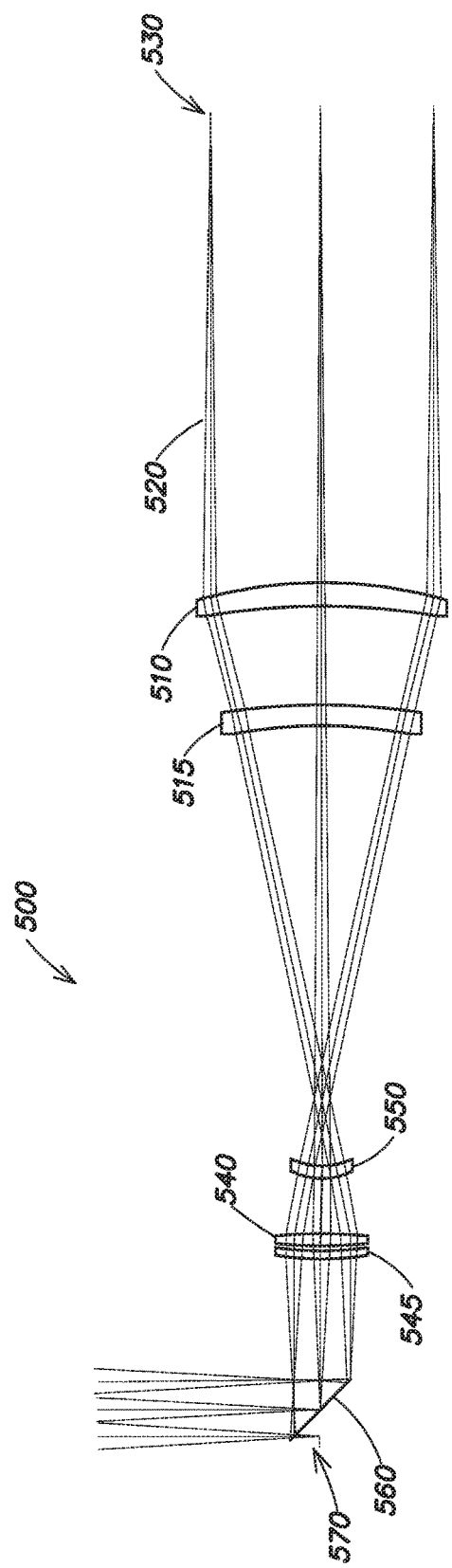
FIG. 5 is an illustration and partial ray trace of a telescope used to simulate the results presented in FIGS. 4A and 4B.

FIG. 5 is an illustration and partial ray trace showing the example telescope used to produce the simulated results shown in FIG. 4A. The telescope 500 includes a first pair of lenses 510, 515 that receive electromagnetic radiation 520 from an entrance pupil 530, a second pair of lenses 540, 545, a field corrector 550 positioned between the two pairs of lenses, and a back-scan mirror 560 positioned at the exit pupil 570 of the telescope. Examples of the telescope 500 can be optimized to have good imaging performance and low pupil aberrations. For the examples corresponding to FIGS. 4A and 4B, the first lens is an asphere and the material of the first lens 510 is Germanium (Ge), the material of the second and fourth lenses 515, 545 is Zinc Selenide (ZnSe), the material of the third lens 540 is Ge, and the field corrector 550 is an asphere and its material is Ge.

To produce the simulated results illustrated in FIG. 4A, the telescope 500 was designed (i.e., shapes and positioning of the various lenses) to have the field mapping of Equation (1). The resulting system has a slight negative (barrel) field distortion in object space. Referring to FIG. 4A, the curves indicate the wander or motion (in units of pixel IFOV) of the field points 321-335 about their nominal positions on the sensor frame FOV 310 during back-scan as the image is back-scanned through the field-of-view of the afocal telescope. The arrows indicate the direction of the motion. The curves are offset from one another to aid viewing. The lengths of the various curves indicate the amount of image point wander for each field point. As noted above, the field mapping of Equation (1) minimizes image wander for field points along a single axis, as demonstrated by the results shown in FIG. 4A. There is very little image wander for field points along y=0 horizontal line, corresponding to the scan direction; however, there is significant wander as |y| increases. The maximum blur length in this example is approximately 2.0 pixels.

To produce the simulated results illustrated in FIG. 4B, the telescope 500 was designed to have the field mapping of Equation (2). The resulting system has almost zero distortion for rectilinear imaging without back-scan. Referring to FIG. 4B, the curves again indicate the wander or motion (in units of pixel IFOV) of the field points 321-335 about their nominal positions on the sensor frame FOV 310 during back-scan. The arrows indicate the direction of the motion. The curves are offset from one another to aid viewing. The lengths of the various curves indicate the amount of image point wander for each field point. As discussed above, generally, the back-scan mirror 560 is configured to hold the center point 328 of the field of view 310 fixed during the exposure. As a result, distortion is greatest at the corners of the image. In this example, the maximum blur length during back-scan is about 3.3 pixels.

These simulated results demonstrate that even though the telescope 500 can be designed for high performance imaging and have little to no distortion when there is no motion, during back-scan there is significant wander and resulting image blur, particularly for off-axis field points. Both examples discussed above produce a maximum blur of multiple pixels. For IRST and other applications, high definition FPAs require tight control on the imaging distortion, and even a single pixel shift may cause too much blur for acceptable system performance. Step/stare and IRST systems are widely used; however, this problem of image blurring due to off-axis field point wander (referred to herein as image wander) is not well recognized. As discussed in more detail below, aspects and embodiments are directed to optical design forms that implement optimal field mappings for back-scanned and line-scanned sensors such that imaged field points do not move during the integration time and image blurring can be mitigated.

Figure 6A:
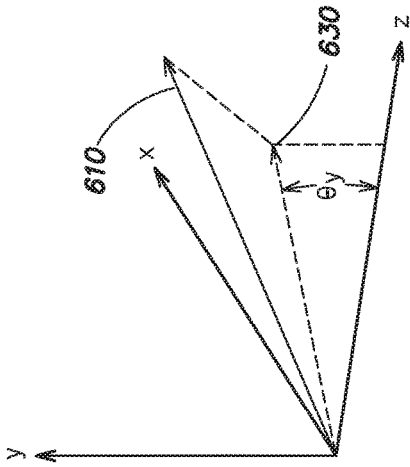
FIGS. 6A and 6B are diagrams illustrate a conventional coordinate system for optical design.
Figure 6B:
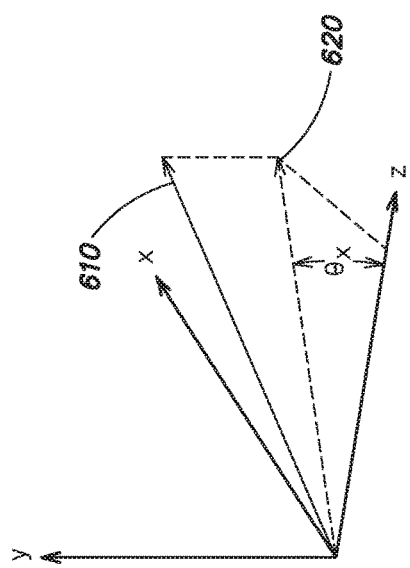

Embodiments of a new field mapping disclosed herein and referred to as an optimal field mapping are based on a polar coordinate system, which differs from the standard coordinate system used in conventional optical design. FIGS. 6A and 6B illustrate how ray angles are conventionally defined for optics, based on the x-y-z coordinate system. FIG. 6A shows the projection of a ray 610 onto the x-z plane, as indicated at 620, and FIG. 6B illustrates the projection of the ray onto the y-z plane, as indicated at 630. The angles, $\theta_x$ and $\theta_y$, are measured from the z-axis (optical axis) to the projected rays 620, 630 in the x-z and y-z planes, respectively. In this conventional coordinate system, the following equations apply:

$$\tan\theta_x = \frac{L}{N} \quad (3)$$

$$\tan\theta_y = \frac{M}{N} \quad (4)$$

In Equations (3) and (4), L, M, and N are the direction cosines of the ray 610 to the x, y, and z axes, respectively. In should be noted that the conventional field mappings of Equations (1) to (4) are associated with the direction of the optical axis. Changing the direction of the optical axis during the optical scan introduces changes to the mapping of image points on the FPA.

Figure 7:
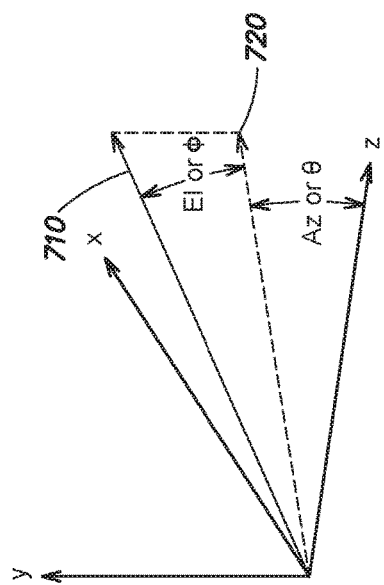
FIG. 7 is a diagram illustrating a polar coordinate system according to aspects of the present invention.

In contrast, as discussed above, aspects and embodiments provide an optimal field mapping that is based on a polar coordinate system. An example of the polar coordinate system is illustrated in FIG. 7. Rays to/from distant objects can be defined according to azimuth (Az) and elevation (El) angles. In this coordinate system, the azimuth angle, denoted herein as $\theta$, is the same as $\theta_x$ in the conventional coordinate system. However, the elevation angle, denoted herein as $\phi$, is not the same as $\theta_y$ in the conventional coordinate system. Here, $\phi$ is the angle of the ray 710 measured from the x-y plane, not the angle from the z-axis to the ray 720 projected onto the y-z plane. For the purposes of explanation, the following discussion assumes scanning to be in the azimuth direction; however, those skilled in the art will readily appreciate, given the benefit of this disclosure, the alterations to account for scanning in the elevation direction instead.

The optimal field mapping from object space to image space of an afocal telescope is given by:

$$\theta_i = A_{mag}\theta_o \quad (5)$$

$$\phi_i = A_{mag}\phi_o \quad (6)$$

Those skilled in the art will appreciate, given the benefit of this disclosure, that $A_{mag}=1$ is the degenerate case where there is no difference between the mapping of Equations (5) and (6) and the conventional mappings of Equations (1) and (2); however, generally and in a wide variety of applications, a non-unity magnification is desired. Unlike the conventional field mappings of Equations (1) and (2), the optimal field mapping according to Equations (5) and (6) is not rotationally symmetric. It has an anamorphic nature. As demonstrated and discussed further below, this optical field mapping according to aspects of the present invention removes field point motion during back-scan. Equations (5) and (6) match the paraxial scaling equations of an afocal telescope. Thus, this optimal field mapping implements angular magnification of an afocal telescope in two orthogonal directions. In other words, an angular shift in $\theta_o$ (which is an azimuth rotation and the scanning motion that is desirably implemented in operation of the system) introduces a simple, but scaled due to the magnification $A_{mag}$, shift in $\theta_i$ for all rays in image space. An angular shift in $\theta_o$ produces no change in the ray elevation angles ($\phi_i$) in image space.

Figure 8:
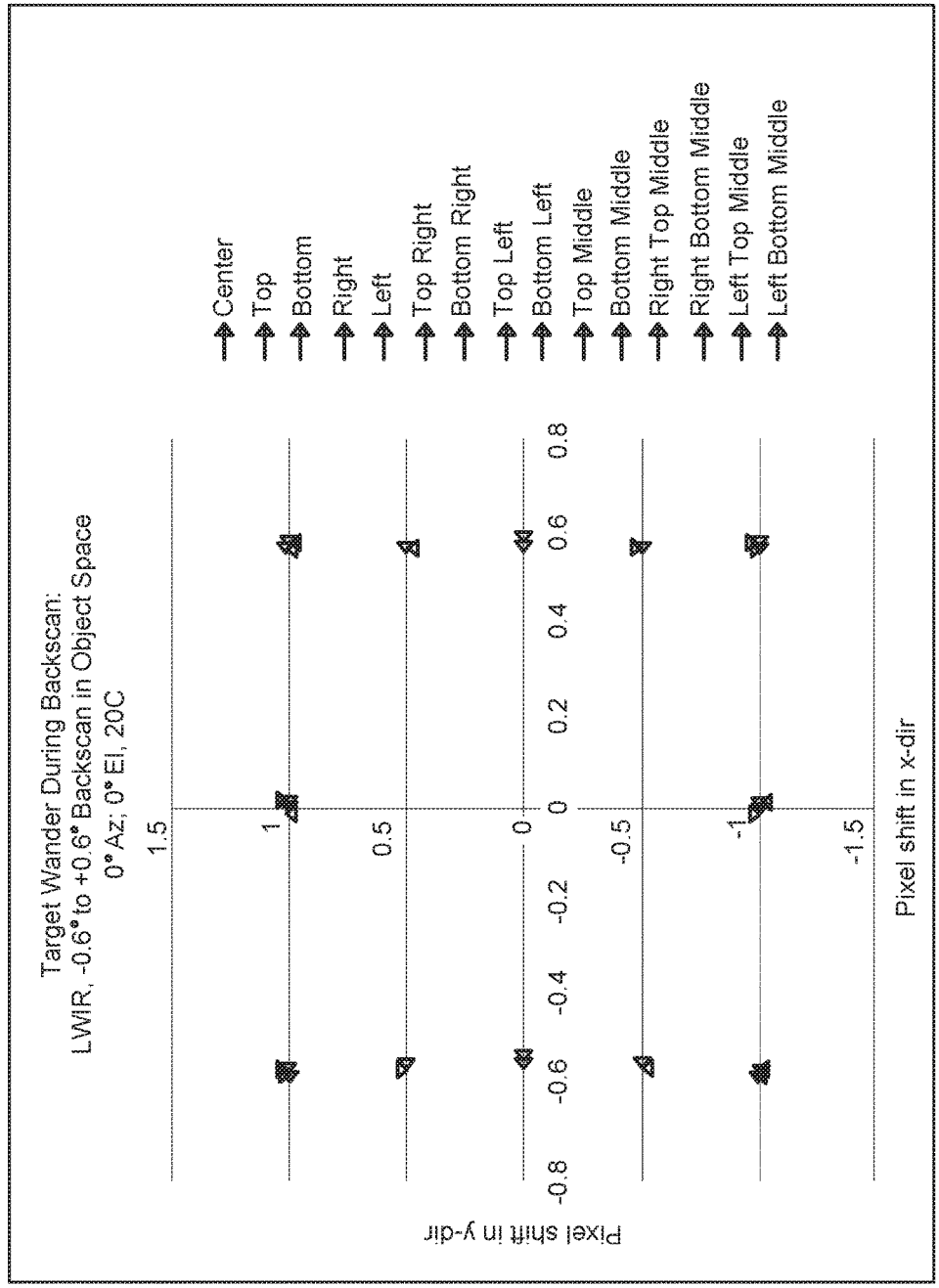
FIG. 8 is a graph illustrating simulated image point wander for the field points of FIG. 3 for an example of an afocal telescope optimized according to the field mapping of Equations (5) and (6), according to aspects of the present invention.
Figure 9:
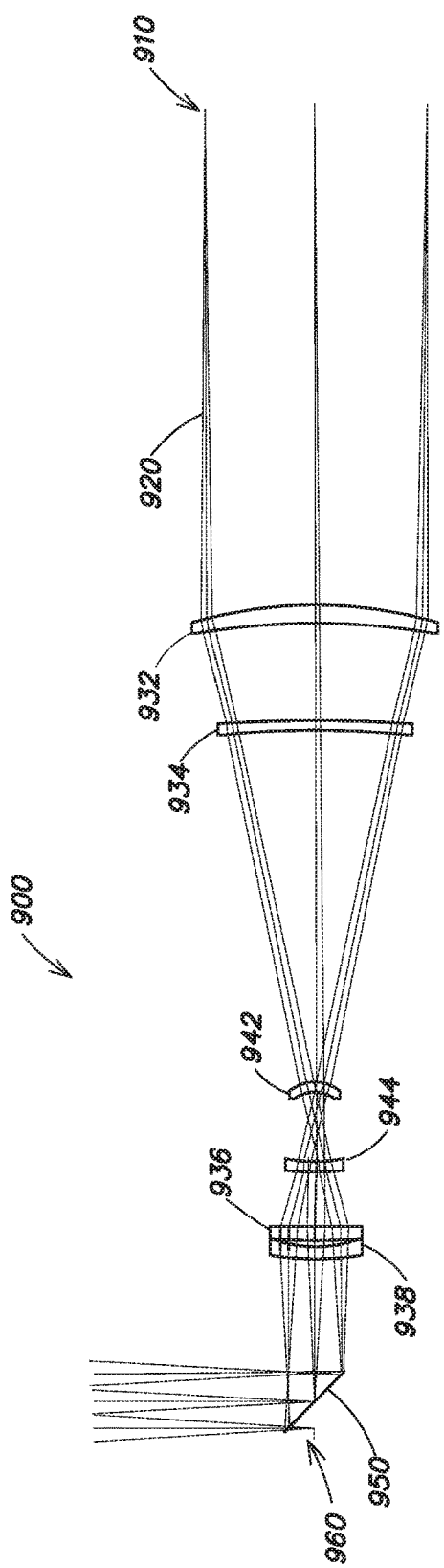
FIG. 9 is an illustration and partial ray trace of a telescope used to simulate the results presented in FIG. 8, according to aspects of the present invention.

FIG. 8 illustrates the simulated image wander about the nominal positions (for the field points 321-335 of FIG. 3) for an example of a telescope similar to that shown in FIG. 5, but designed according to the optimal field mapping of Equations (5) and (6). The telescope is illustrated in FIG. 9. In this example, the telescope 900 includes a plurality of lenses 932, 934, 936, and 938 that receive electromagnetic radiation 920 via an entrance pupil 910 and direct the electromagnetic radiation to an exit pupil 960. A back-scan mirror 950 is positioned at the exit pupil 960. The telescope 900 further includes a field correcting assembly including two field correctors 942, 944 positioned between the second lens 934 and third lens 936. An intermediate image is formed between the two field correctors 942, 944. In one example, the telescope 900 is optimized to have good imaging performance, low pupil aberrations, low imaging distortion, and the optimal field mapping for back-scan operation as set forth in Equations (5) and (6). In the example corresponding to the simulated results shown in FIG. 8, the first lens 932 is an asphere made of Ge, the second lens 934 is made of ZnSe, the third lens 936 is made of Ge, and the fourth lens 938 is made of ZnSe. The two field correctors 942, 944 are "free-form" non-rotationally symmetric lenses made of Ge. As discussed in more detail below, the field correctors 942, 944 are configured to implement the optimal field mapping and to maintain good pupil imaging. For the example shown in FIG. 8, the frame FOV is 2.887°×1.624°, the sensor is a two-dimensional FPA having 1280×720 pixels, the magnificent of the afocal telescope ($A_{mag}$) is 4×, and the pixel instantaneous field-of-view (IFOV) is 39.4 μrad. The back-scan is over ±0.6° in object space. The entrance pupil 910 has a diameter of 5 inches, the imager focal length is 5 inches (for a system effective focal length of 20 inches), and the spectral band of the electromagnetic radiation 920 is 8-9.5 μm (long-wave infrared).

Referring to FIG. 8, it can be seen that the image wander is zero or very small for all field points 321-335 and greatly reduced for the off-axis field points relative to either of the conventionally designed examples shown in FIGS. 4A and 4B. The curves in FIG. 8 indicate motion (in units of pixel IFOV) of the chief ray at the various field points during the back-scan operation. The arrows indicate direction of the motion. The maximum image blur during the back-scan is approximately 0.025 pixels.

Thus, the simulated results presented in FIGS. 4A, 4B, and 8 demonstrate that a telescope incorporating field correctors configured to implement the optimal field mapping of Equations (5) and (6) can achieve significant improvements in image wander during back-scan for all field points across the sensor, not limited to only those that are on-axis or along the direction of the scan, and associated vastly reduced image blur.

Figure 10:
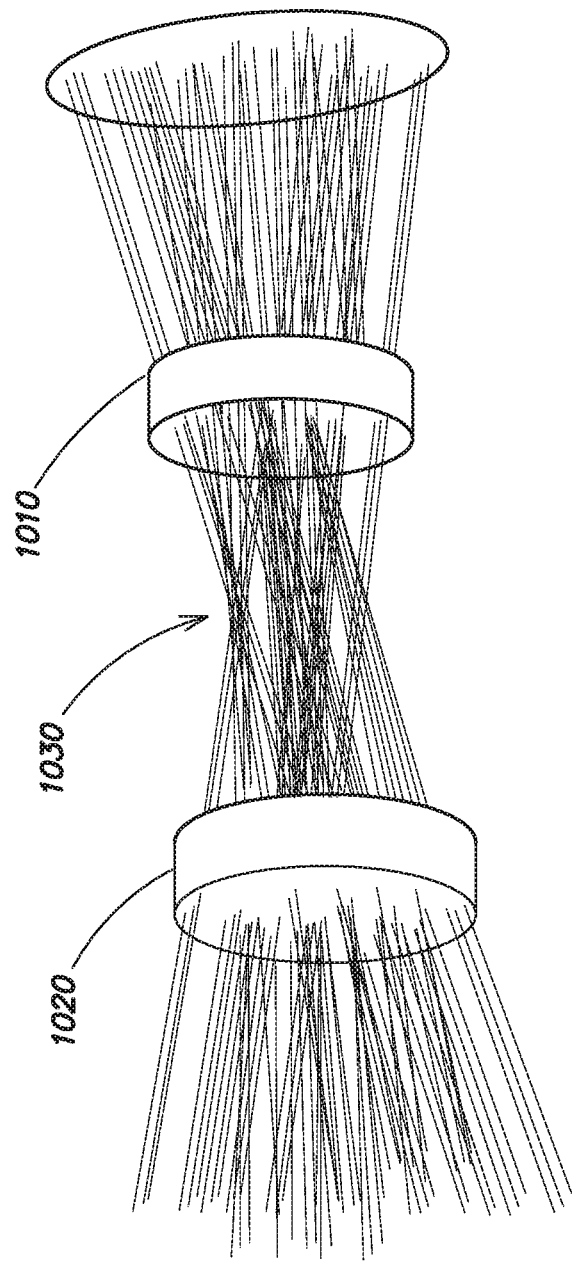
FIG. 10 is an illustration and partial ray trace of one example of a field correcting assembly configured to implement the field mapping of Equations (5) and (6), according to aspects of the present invention.

According to one embodiment, the field correctors are configured as field correcting lenses that have non-rotationally symmetric aspherical departure on the front and back surfaces. An example of a field correcting assembly including two such field correcting lenses is shown in FIG. 10. In the illustrated example, the field correcting assembly includes a first field correcting lens 1010 and a second field correcting lens 1020, with an intermediate image 1030 positioned between the two lenses. The lenses 1010, 1020 introduce small offsets of the chief ray in the x- and y-directions to implement the field mapping, while simultaneously maintaining the pupil imaging by controlling the tilt of the chief ray in the x- and y-directions. In one example the aspherical sagittal departure is in the form of even powers of x and y. In one example, the two lenses 1010, 1020 have terms up to the sixth order:

$$\Delta z = a_1 x^2 + a_2 y^2 + a_3 x^4 + a_4 x^2 y^2 + a_5 y^4 + a_6 x^6 + a_7 x^4 y^2 + a_8 x^2 y^4 + a_9 y^6$$

Figure 11:
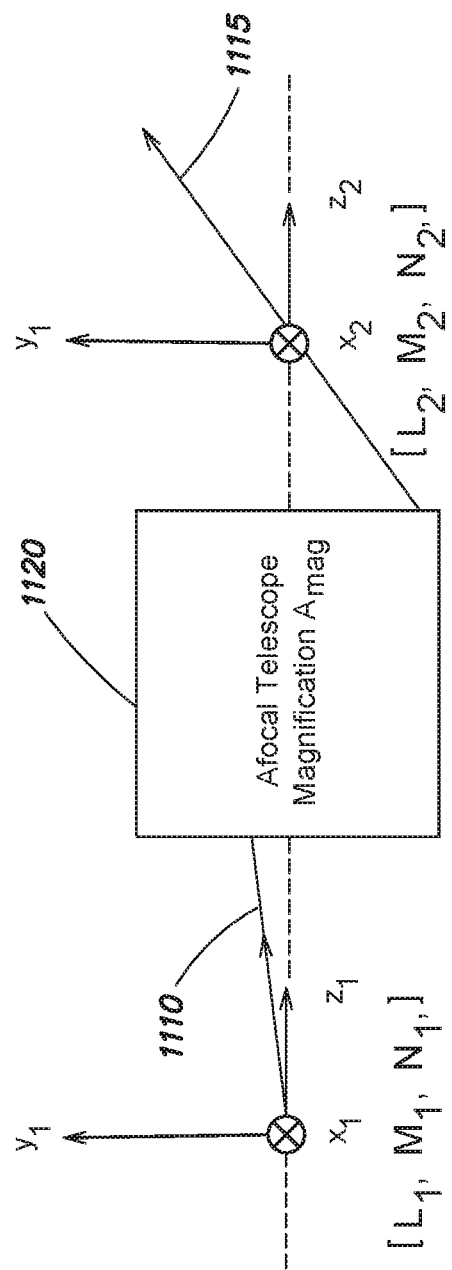
FIG. 11 is a block diagram showing a ray and its direction cosines (L, M, N) before and after the afocal telescope.

According to certain embodiments, there is provided a method of applying the optimal field mapping of Equations (5) and (6) to optical design, so as to construct a telescope such as that shown in FIG. 9, and other examples of telescopes configured to have greatly reduced image wander during back-scanning. FIG. 11 is a schematic diagram showing rays 1110 and 1115 entering and exiting an afocal telescope 1120. The vectors $[L_1, M_1, N_1]$ and $[L_2, M_2, N_2]$ describe the directions cosines of the chief ray on the input and output sides of the afocal telescope 1120, respectively. It is preferable to define the optimal field mapping in such a way that relates the values of $L_2$ and $M_2$ to the values of $L_1$ and $M_1$ because these direction cosines are easily obtained using industry standard ray-tracing codes. Thus, $$M_2 = \sin[A_{mag} \sin^{-1}(M_1)] \tag{7}$$

$$\frac{L_2}{N_2} = \tan\left[A_{mag} \tan^{-1}\left(\frac{L_1}{N_1}\right)\right] \tag{8}$$

$$N_2 = \sqrt{\frac{1 - M_2^2}{1 + \left(\frac{L_2}{N_2}\right)^2}} \tag{9}$$

$$\frac{M_2}{N_2} = \tan[A_{mag} \sin^{-1}(M_1)]\sqrt{1 + \tan^2\left[A_{mag} \tan^{-1}\left(\frac{L_1}{N_1}\right)\right]} \tag{10}$$

$$L_2 = \tan\left[A_{mag} \tan^{-1}\left(\frac{L_1}{N_1}\right)\right] \sqrt{\frac{1 - M_2^2}{1 + \tan^2\left[A_{mag} \tan^{-1}\left(\frac{L_1}{N_1}\right)\right]}} \tag{11}$$

Equations (7) and (11) can be used to determine the desired direction cosine values $L_2$ and $M_2$ for the ray 1115 in image space given the direction cosines $L_1$ and $M_1$ for the ray 1110 in object space. These equations allow a designer to optimize the afocal telescope 1120 for the desired distortion mapping.

Equations (7)-(11) can be rewritten to show:

$$\tan(\bar{\theta}_x) = \tan(A_{mag}\theta_x) \tag{12}$$

$$\tan(\bar{\theta}_y) = \tan\left[A_{mag} \sin^{-1}\left(\frac{\tan(\theta_y)}{\sqrt{1 + \tan^2(\theta_x) + \tan^2(\theta_y)}}\right)\right]\sqrt{1 + \tan^2(A_{mag}\theta_x)} \tag{13}$$

Equation (13) demonstrates that there is a cross-coupling of terms, indicating, as discussed above, that the optimal field mapping according to aspects of the present invention is not rotationally symmetric and has an anamorphic nature.

Figure 12A:
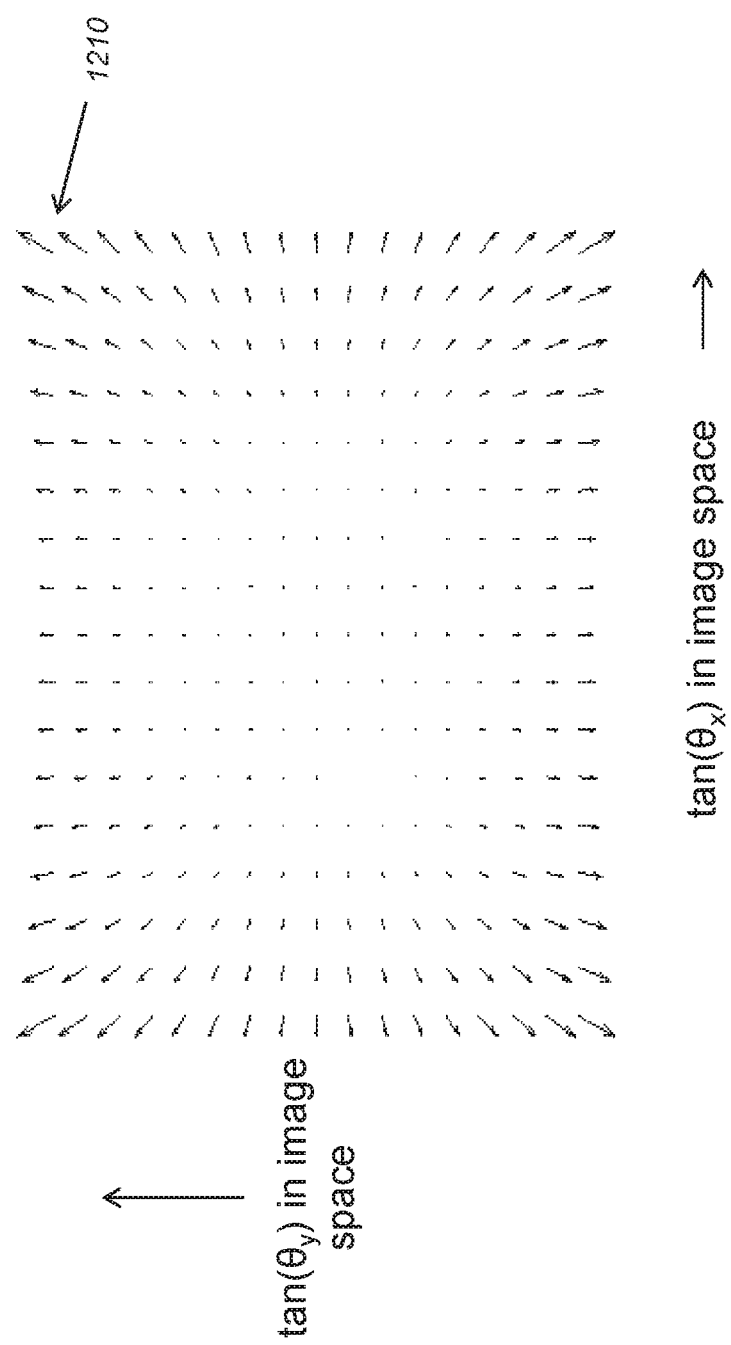
FIG. 12A is diagram illustrating a comparison between the distortion characteristics associated with the optimal field mapping according to aspects of the present invention and the conventional field mapping of Equation (2)
Figure 12B:
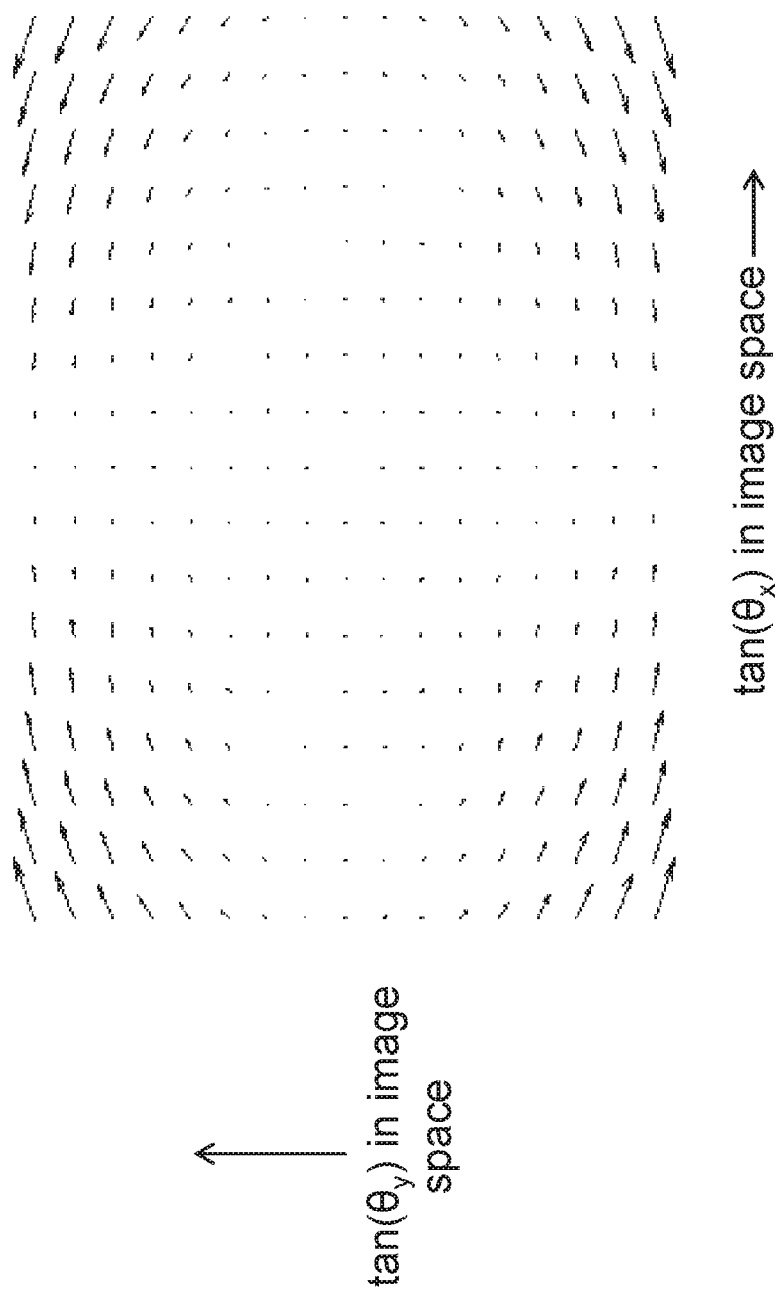
FIG. 12B is a diagram illustrating a comparison between the distortion characteristics associated with the optimal field mapping according to aspects of the present invention and the conventional field mapping of Equation (1)

The optimal field mapping disclosed herein can be used to design a telescope to significantly reduce image wander during back-scan, while also retaining good distortion characteristics. FIG. 12A illustrates a comparison between the distortion characteristics of an afocal telescope designed according to the standard field mapping of Equation (2) and a similar afocal telescope designed according to the optimal field mapping of Equations (5) and (6). FIG. 12A is a plot of the vector differences between the non-rotationally symmetric optimal field mapping of Equations (5) and (6) and the standard rotationally symmetric field mapping of Equation (2). In the illustrated example the FOV in object space is 3° square, and the angular magnification ($A_{mag}$) is 4×. It is notable that the error vector direction (e.g., at 1210) is not radial. FIG. 12B provides a comparison between the distortion characteristics of an afocal telescope designed according to the standard field mapping of Equation (1) and a similar afocal telescope designed according to the optimal field mapping of Equations (5) and (6). In the standard field mapping according to Equation (1), the equations defining the tangents of the ray angles in the x- and y-directions scale the ray angle from the z-axis and do not introduce a rotation about the z-axis. FIG. 12B is a plot of the vector differences between the non-rotationally symmetric optimal field mapping of Equations (5) and (6) and the standard rotationally symmetric field mapping of Equation (1). In the illustrated example the FOV in object space is 3° square, and the angular magnification ($A_{mag}$) is 4×. As shown in FIG. 12B, the field mappings produce very similar distortion characteristics (almost no length to the error vectors) along the x- and y-axes, but differ elsewhere. The distortion characteristics produced by the optimal field mapping are more similar to those of the standard field mapping of Equation (1) and they are to the standard field mapping of Equation (2). A power series expansion for the optimal field mapping (to the $5^{th}$ order) is given by:

$$\bar{\theta}_x = A_{mag}\theta_x \text{ (exact)}$$

$$\bar{\theta}_y = A_{mag}\theta_y + \left[\frac{A_{mag}^2(A_{mag} - 1)}{2}\theta_y - \frac{A_{mag}(A_{mag}^4 - 1)}{3}\theta_y^3\right]\theta_x^2 + \frac{A_{mag}(5A_{mag}^2 - 1)(A_{mag}^2 - 1)}{24}\theta_y\theta_x^4 + \ldots$$

As noted above, where $A_{mag}=1$, the mapping simplifies to the simple degenerate case.

Figure 13:
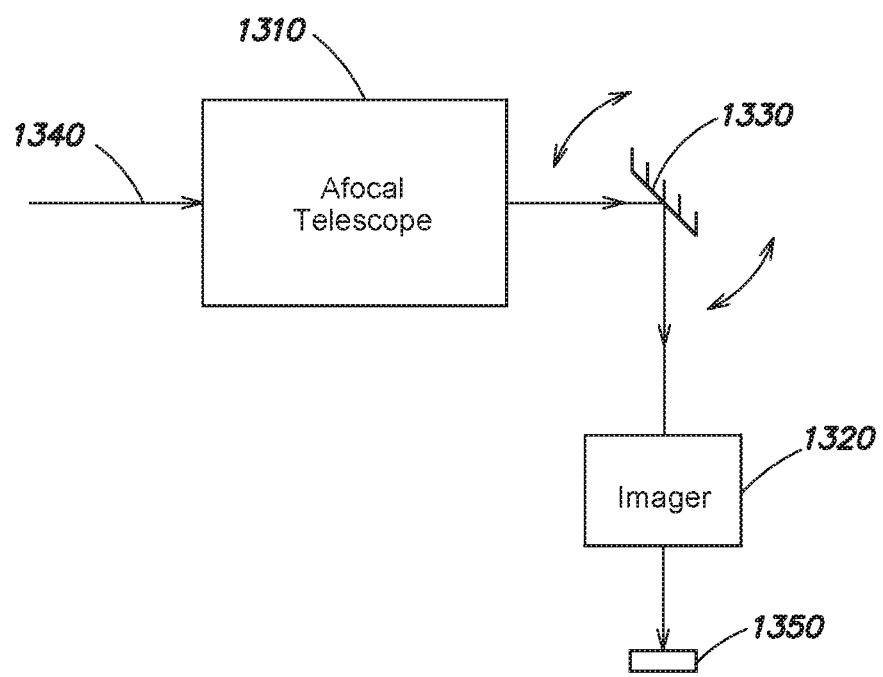
FIG. 13 is a block diagram of one example of a back-scanned imaging system.

As discussed above, the optimal mapping according to aspects of the present invention can be applied to the design of real optical imaging systems for a variety of applications. FIG. 13 is a block diagram of one example of a back-scanned imaging system that includes an afocal telescope 1310, an imager 1320, and a back-scan mirror positioned between the afocal telescope and the imager. The afocal telescope receives electromagnetic radiation 1340 from a viewed scene and directs the radiation to the imager 1320, which focuses the radiation onto an imaging sensor 1350 (e.g., an FPA). For back-scanned systems such as that shown in FIG. 13, the optimal field mapping according to aspects of the present invention is applied to the afocal telescope 1310 only, not to the imager 1320. The optimal field mapping ensures that the chief rays from the imager 1320 are undeviated in object space (due to the afocal telescope 1310) during the back-scan operation. The distortion mapping of the imager 1320 is independent. As discussed above, because the optimal field mapping is not rotationally symmetric, the field correction must be implemented with non-rotationally symmetric optical elements, such as cylindrical optics, general polynomial aspheric surfaces, etc., for example, using field correcting lenses such as those shown in FIG. 10. Additionally, because the optimal field mapping is not rotationally symmetric, the back-scan direction must be oriented correctly with respect to the corrected afocal telescope. As noted above, the presented equations assume that the back-scan is in the azimuth direction; adjustments must be made to instead design the correcting surfaces for scanning in the elevation direction, as will be readily appreciated by those skilled in the art, given the benefit of this disclosure.

In certain examples, such as IRST applications, the telescope system includes multiple afocal stages on the object space side of the back-scan mirror 1330. In such cases, the corrections to implement the optimal field mapping should correct the entire afocal system as an ensemble. The anamorphic elements used to implement the correction (i.e., the field correctors) can be located in any of the afocal stages. However, because the optimal field mapping is not rotationally symmetric, it is important to maintain the desired relative orientations of the back-scan operation and the field correctors if image rotations occur in the system.

Figure 14:
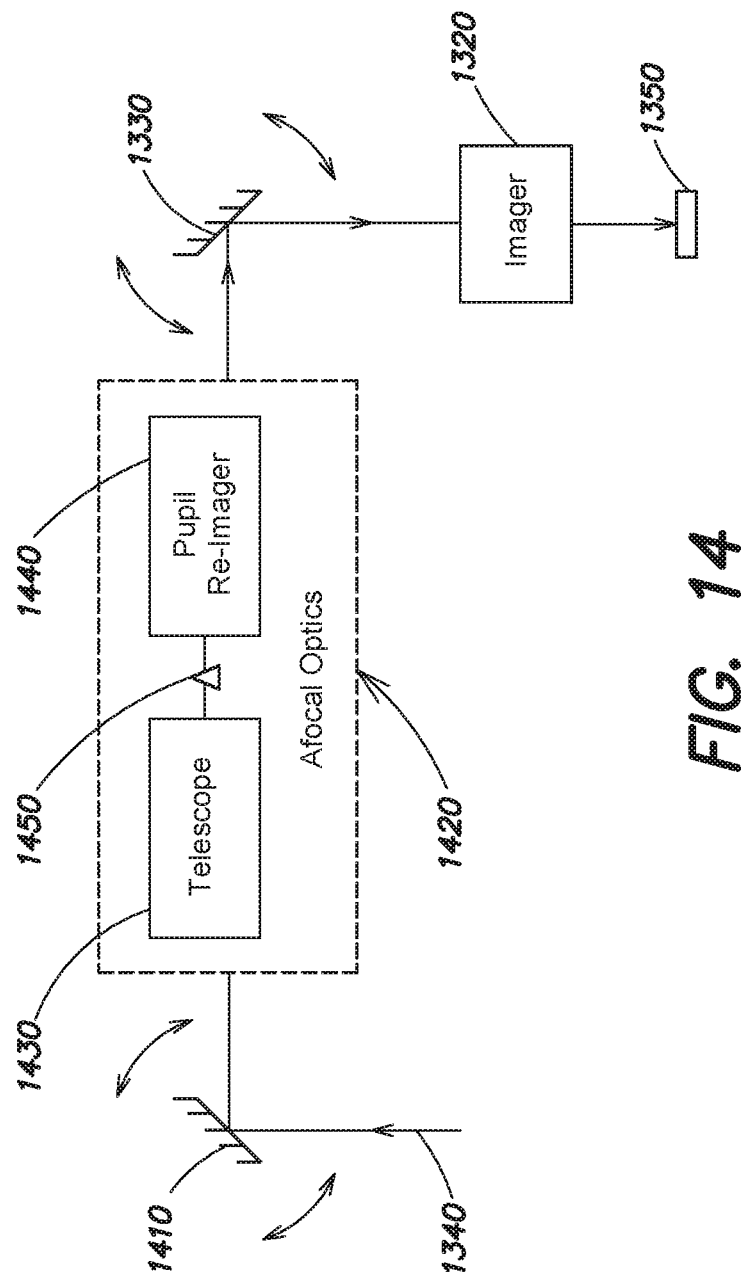
FIG. 14 is a block diagram of one example of a back-scanned imaging system including multiple afocal stages.

FIG. 14 is a block diagram illustrating one example of the functional layout of an IRST system. In this example, a head mirror 1410 is positioned on the object space side of the afocal optics 1420, and the afocal optics 1420 includes an afocal telescope 1430, a pupil re-imager 1440 (also referred to as a pupil relay), and a derotation element 1450 positioned between the afocal telescope 1430 and the pupil re-imager 1440. The head mirror 1410 implements the nominal scan of the system FOV. In this case, the image will rotate through the telescope 1430 if the head mirror 1410 rotates out of the plane of incidence. The derotation element 1450 restores the image orientation for the back-scan operation. The derotation element 1450 can be a derotation prism, for example. In certain examples the exit pupil of the afocal telescope 1430 is located close to the derotation element 1450 to keep the derotation element as small as possible. The pupil relay 1440 re-images the pupil back to the back-scan mirror 1330, which implements the step-stare function as discussed above. In order to have optimal performance, the afocal optics 1420 implements the optimal field mapping.

In certain examples, it is desirable that the afocal telescope 1430 has a rotationally symmetric distortion mapping (typical of on-axis telescope designs) because the image rotates through its field of view. Accordingly, the optimal field mapping of Equations (5) and (6), as associated anamorphic field corrections, can be implemented by one or more optical element(s) in the pupil relay 1440 because the derotation element that precedes it corrects the image orientation. However, a variety of other configurations can be implemented. For example, in configurations where the afocal optics 1420 is designed such that the optical elements contribute to the distortion field in a symmetric manner (e.g., an on-axis design with rotationally symmetric optics), the anamorphic field correcting elements that implement the optimal field mapping can be rotated about the optical axis to match the image rotation caused by the head mirror 1410. In another example, an off-axis (in field or aperture) afocal telescope 1430 (e.g., a three-mirror or four-mirror anastigmat) can be used and corrected to effectively have a rotationally symmetric field mapping. In this case, the pupil relay 1440 can be configured to compensate the afocal telescope 1430 to give the desired field mapping for the entire afocal optics 1420. In another example, an off-axis (in field or aperture) afocal telescope 1430 can be used, along with a rotating field corrector or adaptive optics configured to correct the field-dependent mapping of the telescope such that the afocal optics 1420 as a whole has the desired optimal field mapping of Equations (5) and (6).

According to one embodiment, the field corrector can include an adjustable or deformable mirror. As known to those skilled in the art, the shape of a deformable mirror may be adjusted under computer control to alter characteristics of the mirror. Accordingly, the optical system may include, or may be coupled to, a computing device, generally referred to herein as a processor, and which may be any type of processor, computer, or other computing/processing device capable of interfacing with and controlling the deformable mirror. The processor may be configured to adjust the shape of the deformable mirror to alter the distortion characteristics of the afocal telescope and control image wander for off-axis field points during the back-scan operation, as discussed above. Use of a deformable mirror for the field correcting mirror may be advantageous in that the shape of the mirror can be controlled by the processor to variably adjust the distortion characteristics of the afocal telescope under different conditions and/or to provide finer control of the image wander.

Figure 15:
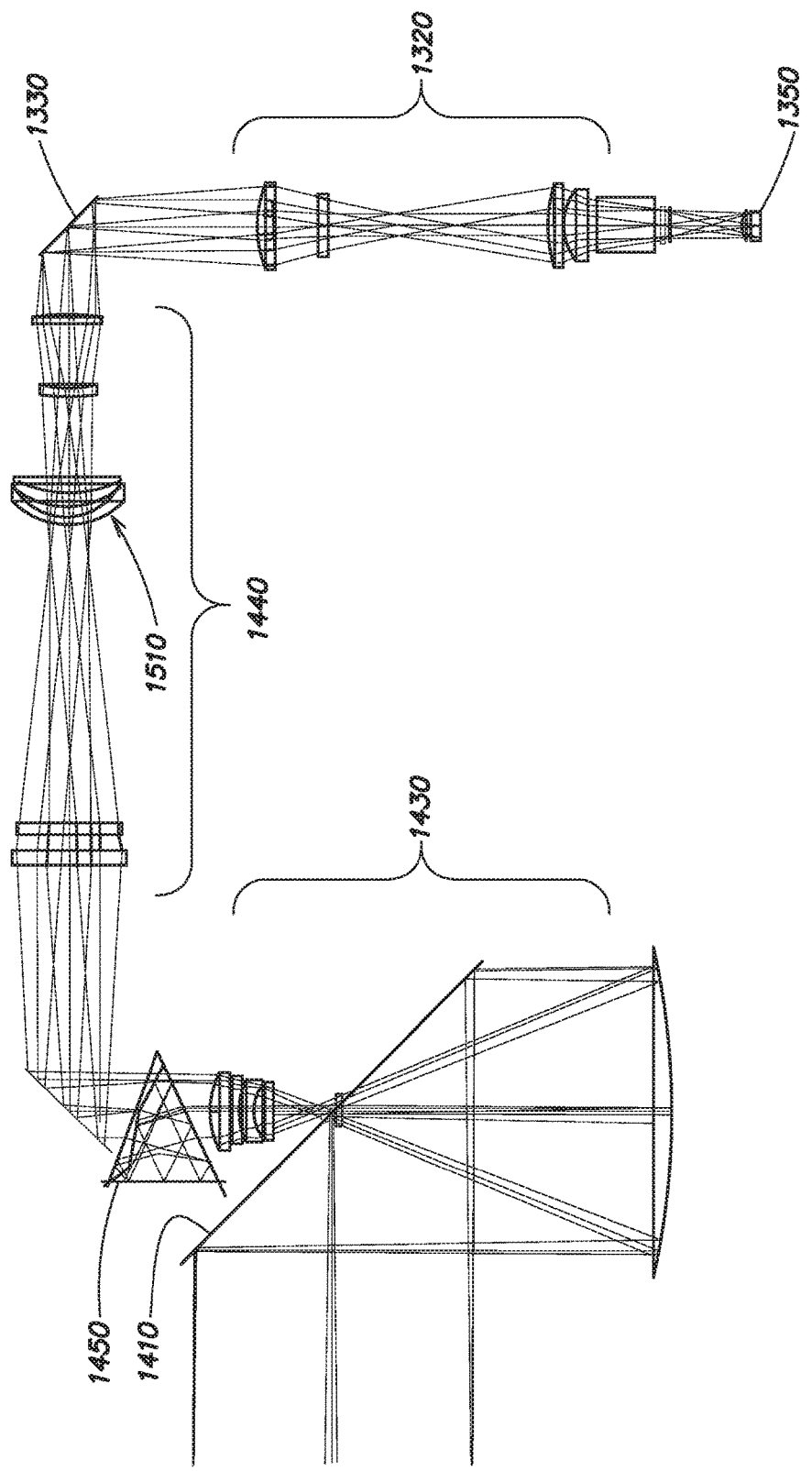
FIG. 15 is a ray trace of one example of an IRST imaging system according to aspects of the present invention.

Referring to FIG. 15 there is illustrated a ray trace of one example of an IRST imaging system configured to have the optimal field mapping of Equations (5) and (6) according to one embodiment. In this example, the field correcting assembly is implemented in the pupil relay 1440. The afocal telescope 1430 in on-axis and has rotational symmetry. The field correcting assembly 1510, which implements the optimal field mapping, includes a pair of anamorphic lenses with general polynomial departures from aspherical surfaces.

Figure 16:
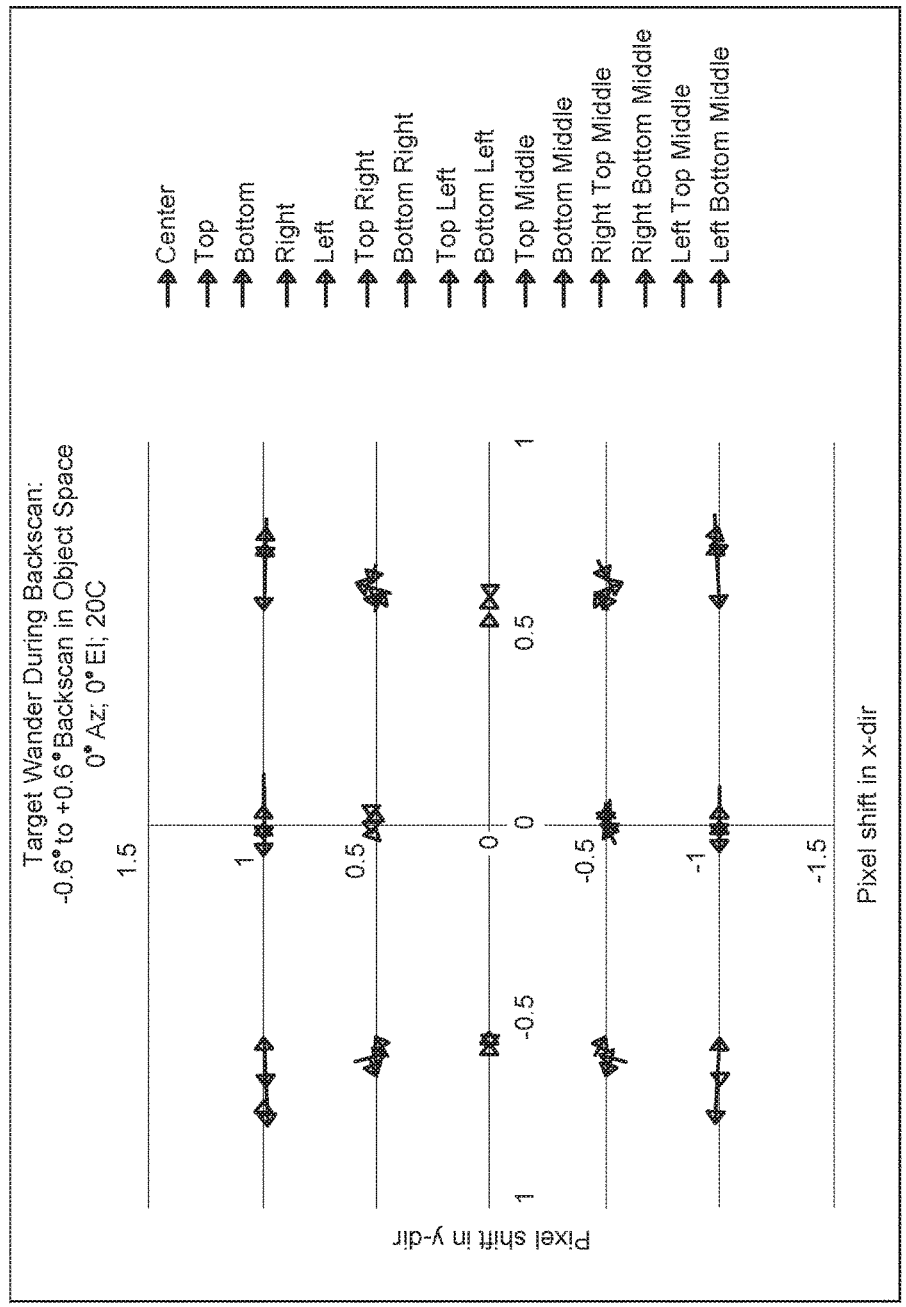
FIG. 16 is a graph illustrating image point wander for the field points of FIG. 3 for the afocal optics of an example of the imaging system shown in FIG. 15.

FIG. 16 illustrates the simulated image wander about the nominal positions (for the field points 321-335 of FIG. 3) for an example of the afocal optics (combination of the afocal telescope 1430 and pupil relay 1440 including the field correcting assembly 1510) shown in FIG. 15. In this example, the frame FOV is 2.93°×1.65°, the sensor is a two-dimensional FPA, the magnificent of the afocal optics ($A_{mag}$) is 5.5×, and the pixel IFOV is approximately 28.4 μrad. The back-scan is over ±0.6° in object space. The curves in FIG. 16 indicate motion (in units of pixel IFOV) of the chief ray at the various field points during the back-scan operation. The arrows indicate direction of the motion. The maximum image blur during the back-scan is approximately 0.25 pixels.

Figure 17:
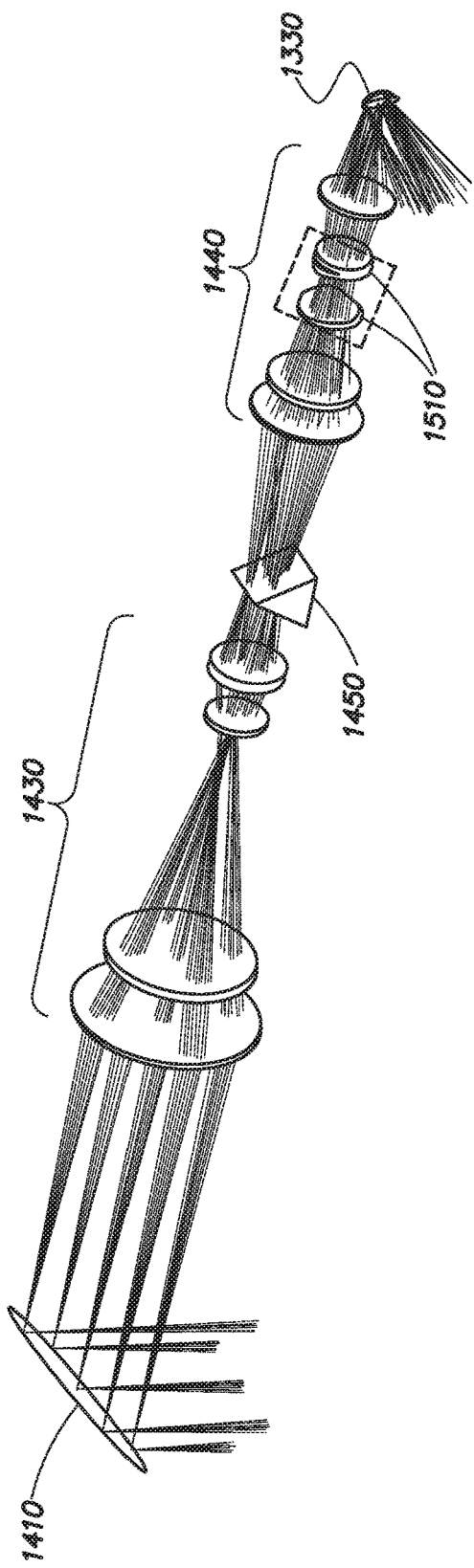
FIG. 17 is a ray trace of one example of an IRST imaging system according to aspects of the present invention.

FIG. 17 illustrates a ray trace of another example of an IRST imaging system. In this example, the afocal telescope 1430 is a 4× on-axis telescope that is configured to implement the standard distortion-free field mapping of Equation (2). The distortion characteristics of the afocal telescope 1430 are thus rotationally symmetric and independent on image rotation. In this example, the derotation element 1450 is a derotation prism that is located at a pupil image. The pupil relay 1440 has 1.25× magnification, such that the total afocal magnification (combination of the afocal telescope and the pupil relay) is 5×. The field correcting assembly 1510 is implemented in the pupil relay 1440 and is configured to implement the optimal field mapping of Equations (5) and (6) and to control pupil aberrations. The field correcting assembly can include a pair of lenses have the form shown in FIG. 10, for example. The system illustrated in FIG. 17 can provide diffraction limited imaging.

Figure 18:
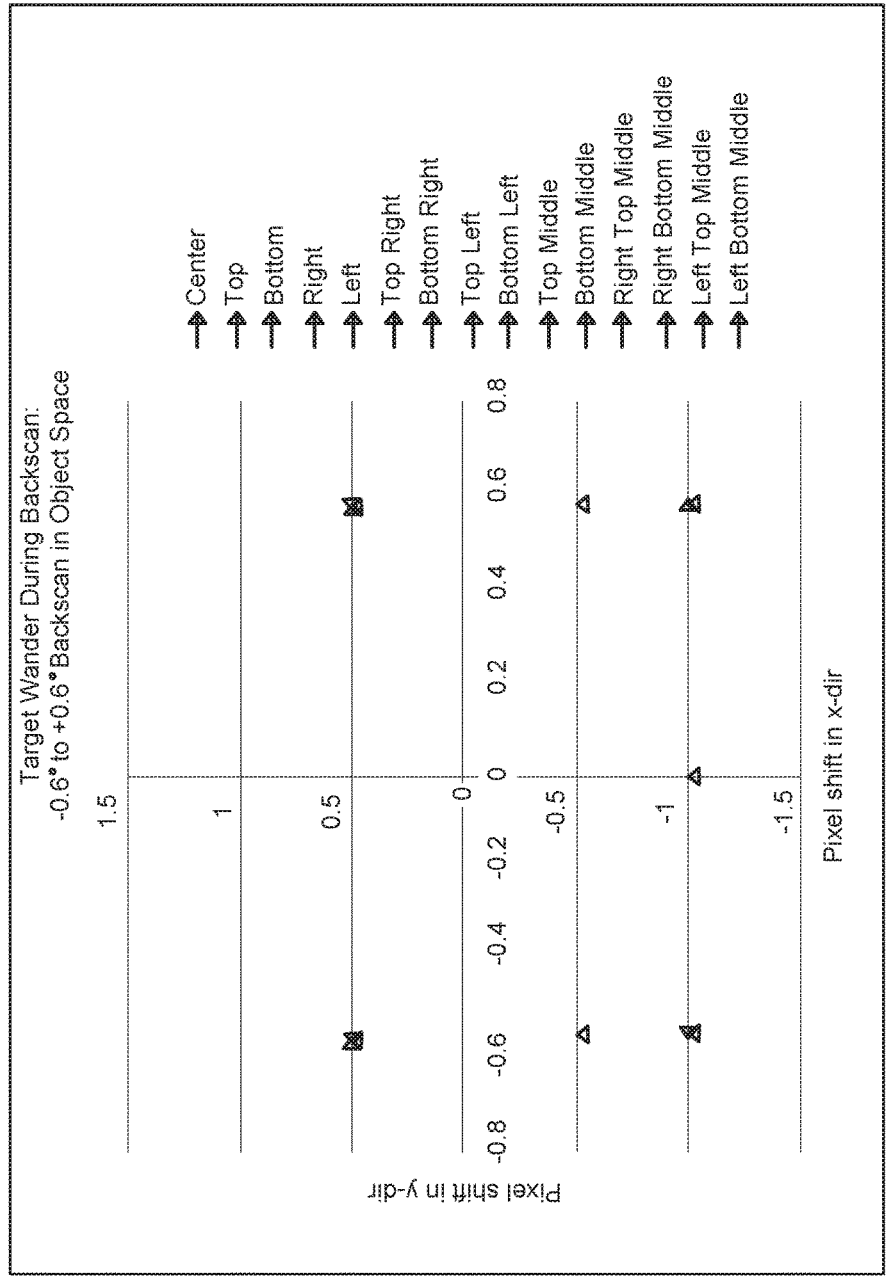
FIG. 18 is a graph illustrating image point wander for the field points of FIG. 3 for the afocal optics of an example of the imaging system shown in FIG. 17, according to aspects of the present invention.

FIG. 18 illustrates the simulated image wander about the nominal positions (for the field points 321-335 of FIG. 3) for the example of the afocal optics (combination of the afocal telescope 1430 and pupil relay 1440 including the field correcting assembly 1510) shown in FIG. 17. The back-scan is over ±0.6° in object space. The curves in FIG. 18 indicate motion (in units of pixel IFOV) of the chief ray at the various field points during the back-scan operation. The arrows indicate direction of the motion. The maximum image blur during the back-scan is approximately 0.025 pixels.

Figure 1B:
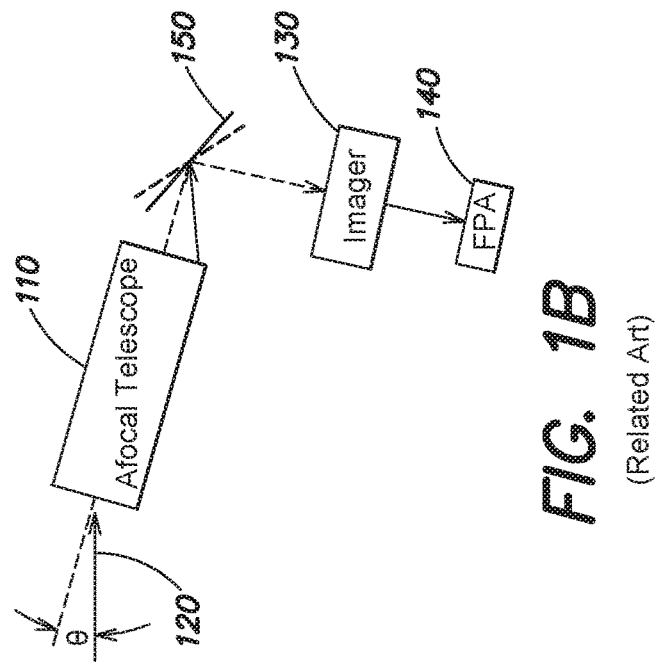
FIG. 1B is a schematic diagram illustrating the technique of back-scanning applied to the system of FIG. 1A.
Figure 1A:
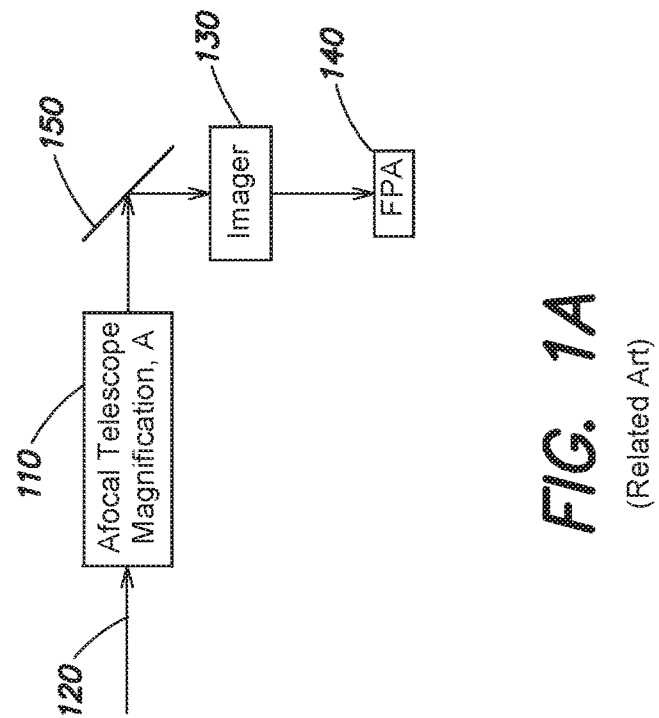
FIG. 1A is a schematic diagram of one example of a step/stare sensor configuration including an afocal telescope and a back-scan mirror.
Figure 2A:
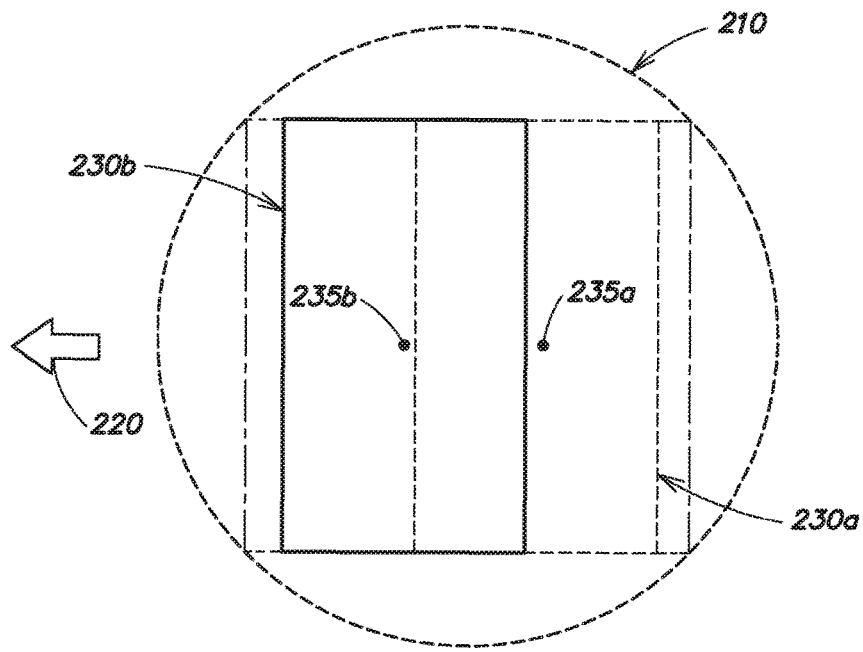
FIG. 2A is a diagram illustrating an example of a sensor's field of view within the field of view of an afocal telescope.
Figure 2B:
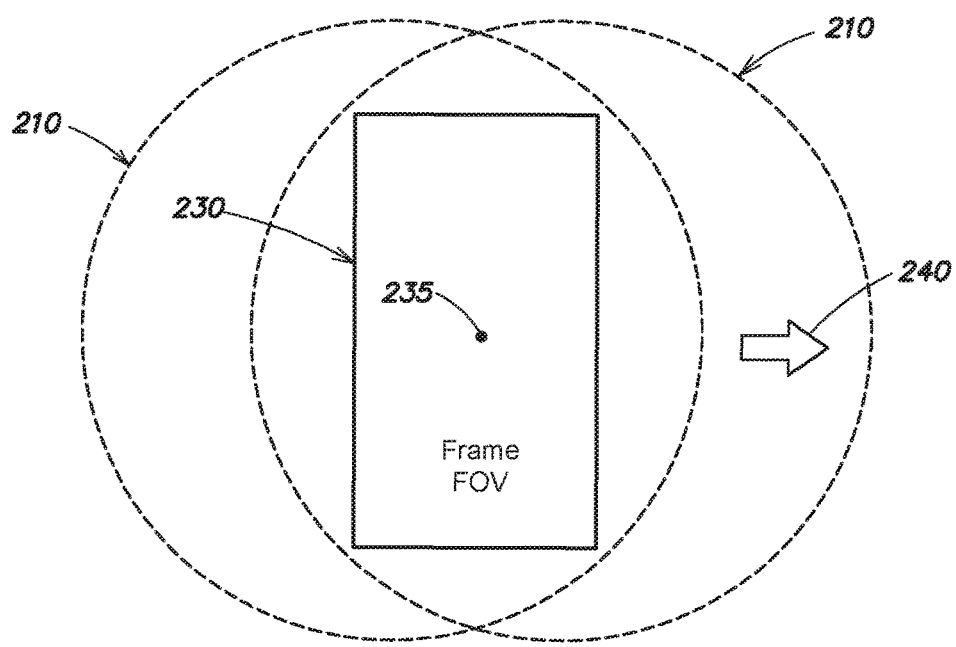
FIG. 2B is a diagram showing the back-scanned sensor field of view in object space corresponding to FIG. 2A.
Figure 19:
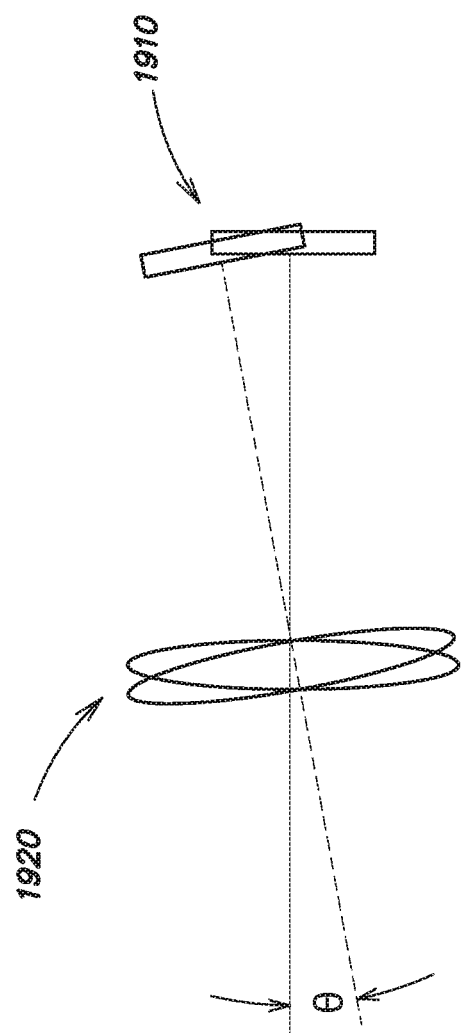
FIG. 19 is a block diagram, shown in top view, of a line-scanned system, illustrating azimuth field scanning.

The above examples demonstrate the use and implementation of the optimal field mapping in back-scanned imaging systems. As discussed above, a similar optimal field mapping can also be applied in line-scanned imaging systems that use time delay integration (TDI). FIG. 19 is a top view block diagram illustrating azimuth field scanning for a line-scanned sensor 1910. The optics are represented generally at 1920, and the azimuth scanning is over an angle θ. The scanning results in movement of the frame FOV, as shown in FIG. 2A. Line-scanned sensors using TDI generally require tight tolerances on the imaging distortion of the optics 1920; otherwise the image will blur during the integration time.

In general, for an imaging system, the mapping between object space and image space is given by:

$$x = f_x(\theta_x, \theta_y) \quad y = f_y(\theta_x, \theta_y)$$

As above, the following derivation assumes scanning to be in the azimuth direction; however, those skilled in the art will appreciate the modifications that can be made to instead account for scanning in the elevation direction. In order for the images not to blur during the TDI operation, the imaging must be shift invariant with rotations in azimuth. This can be achieved using a mapping based on the polar (spherical) coordinate system illustrated in FIG. 7 as discussed above for the back-scan case. For a TDI line-scanned system, the optimal field mapping is given by:

$$x = f\theta_x \quad y = f\phi \tag{14}$$

In Equation (14), φ is measured from the x-z plane to the ray 710 shown in FIG. 7.

The back-scanned imaging systems discussed above include an afocal telescope, and Equations (5) and (6) apply to the afocal telescope. However, certain TDI systems may not include an afocal telescope. Accordingly, for a TDI line-scanned system, the field mapping of Equation (14) applies to the imaging of the entire system, and describes how angles in object space are mapped to points on the imaging detector.

For comparison, the focal mapping equations which parallel the afocal mapping of Equation (1) are as follows and are referred to as an "F-Theta" mapping:

$$x = f \frac{\tan(\theta_x)}{\sqrt{\tan^2(\theta_x) + \tan^2(\theta_y)}} \tan^{-1}\left[\sqrt{\tan^2(\theta_x) + \tan^2(\theta_y)}\right] \tag{15}$$

$$y = f \frac{\tan(\theta_y)}{\sqrt{\tan^2(\theta_x) + \tan^2(\theta_y)}} \tan^{-1}\left[\sqrt{\tan^2(\theta_x) + \tan^2(\theta_y)}\right] \tag{16}$$

Equations (15) and (16) are rotationally symmetric. The optimal field mapping given by Equation (14) can be written in a form convenient for optical design as follows:

$$x = f\theta_x \tag{17}$$

$$y = f\tan^{-1}\left[\frac{\tan(\theta_y)}{\sqrt{1 + \tan^2(\theta_x)}}\right] \tag{18}$$

A power series expansion of Equation (18) can be written as follows (up to the 5$^{th}$ order):

$$y \sim f\theta_y + \left(-\frac{f\theta_y}{2} + \frac{f\theta_y^3}{3}\right)\theta_x^2 + \frac{f\theta_y}{24}\theta_x^4 + \ldots$$

Those skilled in the art will recognize that this is similar to the conventional mapping of Equation (1) with correction terms containing cross-coupling terms for the x- and y-directions. The asymmetric nature of Equations (17) and (18) indicate, similar to the back-scanned system case discussed above, that non-rotationally symmetric field correction is needed. Such correction can be provided in off-axis designs or on-axis designs using anamorphic field correctors, as discussed above.

Thus, according to aspects and embodiments disclosed herein, the problem of image wander during back-scanning or line-scanning with TDI may be mitigated by optimizing the imaging distortion of the optics to minimize the effect of image wander at multiple field points and over multiple configurations. This may be accomplished using anamorphic field correcting elements, as discussed above. Although the above-discussed examples primarily describe refractive optical systems, this approach may be implemented for any afocal design, including reflective or refractive afocal telescopes.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and it is to be appreciated that embodiments of the methods and apparatuses discussed herein are not limited in application to the details of construction and the arrangement of components set forth in the foregoing description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. The scope of the invention should be determined from proper construction of the appended claims, and their equivalents.

What is claimed is:

1. An optical imaging system configured for back-scanned imagery comprising:
    an imaging sensor;
    an imager configured to focus electromagnetic radiation onto the imaging sensor, the imaging sensor being configured to form an image from the electromagnetic radiation;
    afocal optics configured to receive the electromagnetic radiation and to direct the electromagnetic radiation via an exit pupil of the afocal optics to the imager, the afocal optics including at least one anamorphic field correcting optical element configured to implement a non-rotationally symmetric field mapping between object space and image space to set distortion characteristics of the afocal optics to control image wander on the imaging sensor for off-axis image points during a back-scan operation; and
    a back-scan mirror positioned proximate the exit pupil of the afocal optics and between the afocal optics and the imager, and configured to perform the back-scan operation to stabilize the image on the imaging sensor.

2. The optical imaging system of claim 1 wherein the afocal optics includes a plurality of optical elements arranged along a primary optical axis extending between an entrance pupil of the afocal optics and the exit pupil.

3. The optical imaging system of claim 2 wherein the afocal optics includes an on-axis afocal telescope and a pupil relay, the afocal telescope being configured to receive the electromagnetic radiation via the entrance pupil and direct the electromagnetic radiation to the pupil relay, the pupil relay being configured to re-image the electromagnetic radiation onto the back-scan mirror via the exit pupil.

4. The optical imaging system of claim 3 wherein the pupil relay includes the at least one anamorphic field correcting optical element.

5. The optical imaging system of claim 4 wherein the at least one anamorphic field correcting optical element includes first and second lenses, the afocal optics being configured to form an intermediate image proximate the first and second lenses.

6. The optical imaging system of claim 5 wherein each of the first and second lenses includes front and back surfaces having non-rotationally symmetric aspherical departures.

7. The optical imaging system of claim 4 wherein the afocal telescope includes a head mirror configured to scan a field-of-view of the afocal telescope over a field of regard, and further comprising a derotation element positioned between the afocal telescope and the pupil relay.

8. The optical imaging system of claim 2 wherein the plurality of optical elements includes a plurality of lenses.

9. The optical imaging system of claim 1 wherein the imaging sensor is a focal plane array having a two-dimensional array of imaging pixels.

10. The optical imaging system of claim 1 wherein the at least one anamorphic field correcting optical element includes first and second field correcting lenses each with front and back surfaces having non-rotationally symmetric aspherical departures, the afocal optics being configured to form an intermediate image proximate the first and second field correcting lenses.

11. The optical imaging system of claim 1 wherein the non-rotationally symmetric field mapping is defined by $\theta_i = A_{mag}\theta_O$ and $\phi_i = A_{mag}\phi_O$, wherein $\theta_i$ and $\phi_i$ are ray angles in image space, $\theta_o$ and $\phi_o$ are ray angles in object space, and $A_{mag}$ is a magnification of the afocal optics.

* * * * *